Patented Sept. 14, 1926.

1,599,715

UNITED STATES PATENT OFFICE.

PAUL W. PRUTZMAN AND PAUL D. BARTON, OF LOS ANGELES, CALIFORNIA, ASSIGNORS TO GENERAL PETROLEUM CORPORATION, OF LOS ANGELES, CALIFORNIA, A CORPORATION OF CALIFORNIA.

METHOD OF PREPARING AN EMULSION FOR THE PURIFICATION OF OILS.

No Drawing. Application filed June 25, 1925. Serial No. 39,620.

The hereinafter described invention is a continuation in part of our joint application Serial Number 586,038, filed September 2, 1922, and comprises a method of forming an emulsion containing decolorizing adsorbent for use in connection with the purification of hydrocarbon oils generally, although more particularly adapted for use in the treatment of lubricating oils; the objects of the invention being the production of an emulsified mixture for the described purposes which will possess or present uniformity as to the nature of the dispersion, one which will not readily separate and which will, for all practical purposes, be permanent, that is to say, will remain suitable for use and unchanged for a considerable period of time.

Our method invention for the production of an emulsion composed of a mixture of oil and a plastic adsorbent, resides in taking a given or predetermined quantity of the adsorbent material and placing the same in plastic form by the addition thereto of water. A body of oil preferably equal in volume approximately to that of the wet plastic material and likewise the said mass of plastic material is heated until the temperatures thereof approach substantially that of the boiling point of water. The two heated masses are then combined and heated under agitation until emulsification takes place. We now have an emulsified mass or body composed of the plastic adsorbent and a body of oil, as a vehicle for carrying the particles of the adsorbent of the emulsion into intimate contact with the oil in which the emulsion is introduced for intermixture and treatment.

Under our invention the emulsion as produced, will remain in a stabilized condition for a period far in excess of that required for practical operations requiring a plastic adsorbent.

As stated, in the carrying out of our method invention for the production of an emulsion containing adsorptive properties, equal volumes of oil and the plastic decolorizing material are raised to about the boiling point of water, say, 210 F. This may be done separately or together, and with or without agitation.

In case the heating is done separately, the hot oil and the hot plastic material are introduced into the same vessel and are agitated together, preferably by means of a jet of steam, until the whole mass is boiling or very nearly so. The dispersion of the oil and the resulting formation of the emulsion, takes place in a very few minutes when the water contained in the plastic material approaches the boiling point. Up to a temture of about 210 F. the mass consists of "curds" of plastic material in oil, but when the boiling temperature is reached a reversal takes place and the wet material becomes the continuous phase, the oil dispersing evenly in the form of small globules.

Under our invention is produced an emulsion, suspension, or mixture of oil with an adsorbent material which has been rendered plastic or muddy by means of water, such emulsion being characterized by having the aqueous plastic mass as the continuous or outside phase, and the oil as the dispersed or inside phase. In such an emulsion the oil is disseminated throughout the emulsified mass in the form of minute droplets and the emulsion is permanent in structure, and may be stored, pumped, heated, cooled, and otherwise manipulated without separation into its original constituents, and additionally this emulsion is freely miscible with oil so that it may be conveniently used as a means for introducing any desired proportion of adsorbent into an oil to be treated.

By continuation in part of our prior application we mean that this application contains a disclosure of all in the previous application with the exception of the particular definition of the oil as being hydrocarbon. Therefore, we desire it understood that with this above exception, this present application is a continuation of the entire disclosure in the previous application.

In further explanation we will describe the exact steps taken in preparing the emulsion for the decolorization of a batch of mineral lubricating oil.

The adsorbent used may be any one of the solid adsorbents commonly used in decolorizing lubricating oils, such as Florida fuller's earth, clay or preferably an acid treated clay. The quantity of such adsorbent to be taken must be predetermined, that is, it will vary with the quantity of oil to be purified, the activity of the adsorbent, and the degree of purification required. The quantity can be determined only by careful testing of small quantities of the oil with the adsorbent selected, using in such tests various proportions of adsorbent to oil until one proportion is found which gives the desired degree of purification. This proportion being applied to the quantity of oil to be treated, the quantity or weight of adsorbent to be used in such quantity of oil is found.

We now place this quantity of the adsorbent in a plastic condition by the addition of water thereto. This necessarily involves agitation or other mechanical mixture of the adsorbent with the water, and if the adsorbent is one which does not "slack" or mud on the addition of water, it should previously be finely pulverized. The quantity of water to be used is such as will convert the solid adsorbent into a plastic mass or mud, preferably of a thickly fluid consistency, similar to that of thick cream.

The mud or plastic adsorbent is then measured as to volume, and a volume of oil approximately equal to that of the mud is withdrawn from the main body of oil to be treated, and mixed with the mud and the mixture heated, or the mud and the oil may be separately heated and then intermixed.

In either case the heating is carried not higher than 210° prior to mixing. After complete admixture we will have a partial emulsion, or suspension having oil as the outside or continuous phase and the adsorbent mud as the dispersed phase. Such a suspension or emulsion is highly unstable and will separate rapidly into its component parts.

We now proceed to reverse the emulsion to render it stable. This may be done by heating the containing vessel until some of the water contained in the adsorbent mud is vaporized, meanwhile agitating by any mechanical means. Preferably, as it is much more convenient and economical, we inject a jet of steam into the mixture, by which heating and agitation are produced concurrently. In any case, heating and agitation are continued until the emulsion reverses, the curds of suspended mud disappearing and the mass assuming a whitish or creamy consistency, in which droplets of oil suspended in the mud are visible to the eye. We now have a water-continuous emulsion, the oil being the dispersed phase, and the adsorbents retained in the continuous phase will render the emulsion permanent for many hours.

The emulsion so produced is, at any convenient time thereafter, introduced into the remainder of the oil originally taken, for the decolorization thereof, but this decolorization is not a part of this present invention, which resides solely in the production of a stable emulsion suitable for decolorizing oil.

Exactly the same method of procedure is followed if the oil to be treated is an animal or a vegetable oil, except that in such case the preferred adsorbent would be English instead of Florida fuller's earth, acid treated clay, or finely ground mineral charcoal.

We claim:—

1. The method of producing a stable emulsion of an oil and a wet adsorbent material, which consists in mixing the oil with the plastic material for the production of an oil-continuous emulsion, and thereafter in contact with steam heating and agitating said emulsion until the phases reverse with the production of a stable water-continuous emulsion.

2. A stable water-continuous emulsion of an oil and a wet plastic adsorbent material produced by mixing the oil with the plastic adsorbent material and in contact with steam heating and agitating the oil-continuous emulsion first formed until the phases reverse.

In testimony whereof we have signed our names to this specification.

PAUL W. PRUTZMAN.
PAUL D. BARTON.